United States Patent [19]

Heckles et al.

[11] 3,764,570
[45] Oct. 9, 1973

[54] POLYURETHANE FOAMS FROM PHOSPHOROUS CONTAINING SUGAR POLYOLS

[75] Inventors: John S. Heckles; Edwin J. Quinn, both of Lancaster, Pa.

[73] Assignee: Armstrong Cork Company, Lancaster, Pa.

[22] Filed: June 22, 1972

[21] Appl. No.: 265,307

Related U.S. Application Data

[62] Division of Ser. No. 822,025, May 5, 1969, Pat. No. 3,694,430.

[52] U.S. Cl.................. 260/2.5 AR, 260/2.5 AS
[51] Int. Cl............................................. C08g 22/44
[58] Field of Search................. 260/2.5 AS, 2.5 AR

[56] References Cited
UNITED STATES PATENTS 3,682,988  8/1972  Lewis............................ 260/2.5 AR
3,609,107  9/1971  Boyer............................ 260/2.5 AR
3,530,205  9/1970  Patton........................... 260/2.5 AR
3,350,389  10/1967 Patton........................... 260/2.5 AR
3,219,658  11/1965 Friedman....................... 260/2.5 AR Primary Examiner—Donald E. Czaja
Assistant Examiner—C. Warren Ivy
Attorney—Theodore L. Thomas

[57] ABSTRACT

Phosphono-substituted carboxylic acid esters are ester interchanged with sugar polyols. The resulting phosphorus-containing ester can be reacted in conventional manner with conventional polyisocyanates to form self-extinguishing or flame-retardant polyurethane foams having good stability against hydrolysis.

1 Claim, No Drawings

POLYURETHANE FOAMS FROM PHOSPHOROUS CONTAINING SUGAR POLYOLS

CROSS-REFERENCE TO RELATED APPLICATION

This is a division of application Ser. No. 822,025, filed May 5, 1969, now U.S. Pat. No. 3,694,430.

BACKGROUND OF THE INVENTION

1. Field of the Invention

The compounds and process of the present invention are concerned with the reaction of oxyalkylated sugar or glucoside by ester interchange with a phosphono-substituted acetic or propionic acid ester to form a phosphorus containing sugar polyol ester which contains up to about 9 percent by weight phosphorus. These phosphorus-containing polyol esters readily react with organic polyisocyanates to form rigid polyurethane foams which, due to the phosphorus present, have good flame resistance. Due to the phosphorus-to-carbon bond, the resulting polyurethane foam is more resisant to hydrolysis than prior polyurethane foams made with a reaction product of sugar polyols and phosphorus-containing compounds.

2. Description of the Prior Art

U. S. Pat. No. 3,219,658-Friedman teaches the reaction of oxyalkylated sugar or glucoside with tris hydrocarbon phosphites to form sugar polyol phosphites which can be reacted with polyisocyanates to form flame-resistant polyurethane foams and elastomers. The tris hydrocarbon phosphites may also be converted to the corresponding phosphonates by an Arbuzov rearrangement to produce phosphonates. However, these phosphonates do not possess a carboxylic acid ester group. Instead, the esters are phosphite esters or phosphonate esters in the sense that the esterification reaction takes place on the acidic-OH group of the starting phosphite.

U. S. Pat. 3,324,202-Franko-Filipasic teaches the reaction of tris (hydroxyalkyl) phosphates with sugar polyols to form a phosphorus-containing polyol which is also useful to form flame-retardant polyurethanes. None of these compounds, however, are phosphonates and none have the carboxylic acid ester groups of the compounds of the present invention.

SUMMARY OF THE INVENTION

The invention contemplates the reaction of a dialkyl phosphite with an acrylate ester using a basic catalyst such as NaOMe in which Me is methyl. The following reaction illustrates the preparation of the phosphono propionates:

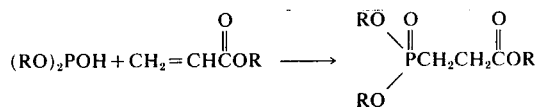

The phosphono-acetates can be prepared by reacting trialkyl phosphite with a chloroacetic acid ester as follows:

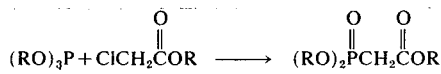

In the above reactions, R is preferably methyl but may be lower alkyl containing 1–4 carbon atoms.

The resulting phosphono esters are then ester interchanged with the product of the reaction of an alkylene oxide and a polyol, preferably surcrose or sorbitol, to form the phosphono-substituted carboxylic acid ester of the oxyalkylated sugar or glucoside.

Up to 6 moles of phosphono ester per mole of sugar polyol can be used depending on how much phosphorus is to be incorporated; sufficient hydroxyl groups should remain on the reaction product to allow further reaction with a polyisocyanate.

The final phosphono-substituted carboxylic acid esters of the sugar polyols can be reacted with polyisocyanates such as toluene diisocyanate to form the polyurethanes. Foam polyurethanes can be obtained by adding water in the conventional manner to the reaction mixture. As an alternative, the foams may be prepared by a halogenated hydrocarbon containing fluorine and possibly some chlorine to form a gas at reaction temperatures to aid in the formation of the cellular structure. The foam polyurethanes can be made by either the one shot or two step method.

DESCRIPTION OF THE PREFERRED EMBODIMENTS

The term "sugar polyol" is used interchangeably with the term "oxyalkylated sugar or glycoside" herein. These compounds are fully described in aforementioned U. S. Pat. No. 3,219,658, particularly at column 1, line 43, over to column 2, line 25 thereof, which disclosure is hereby incorporated herein by reference.

The starting phosphono-substituted carboxylic acid ester will be prepared as described above by reacting a dialkyl phosphite with an acrylate ester or a trialkyl phosphite with a chloroacetic acid ester.

The sugar polyols are then ester interchanged with one to six moles of the phosphono-substituted carboxylic acid esters, leaving at least two hydroxyl groups for further reaction with a polyisocyanate. The ester interchange reaction is conventional, and conventional catalysts such as tetraisopropyl titanate are used.

The reaction using one mole each of the sugar polyol and the phosphonate carboxylic acid ester is as follows:

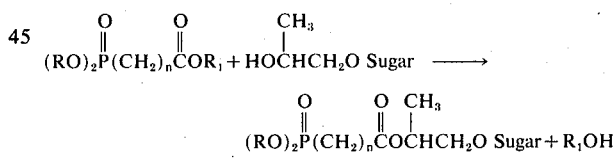

where R and $R_1$ are alkyl groups containing 1–4 carbon atoms, $n$ is 1–2, and the sugar has been oxyalkylated with propylene oxide. The sugar moiety in the above reaction will contain additional hydroxyl groups.

The polyurethane foams may be made in convantional manner starting with these phosphorus containing ester interchange reaction products of the sugar polyol and the carboxylic acid ester. These reaction products are used with an amine catalyst, and a blowing agent. The blowing agent will preferably be one of the fluorinated hydrocarbons, and it will be used in known manner. Surfactants, particularly silicone surfactants, are often added to the foamable mixture in order to control cell size and foam structure. The amine catalysts, such as triethylene diamine, are also used in conventional amounts in conventional manner. The polyisocyanate involved may be any of those normally used in these polyurethane foam-making processes. The amount of polyisocyanate to be used will be such to produce a ratio of isocyanato groups to hydroxyl groups of about 1 or slightly more, for example 1.05.

One of the advantages of the invention is the ease with which polyol combinations may be used to prepare the polyurethane foams. Varying amounts of the sugar polyols and the phosphorus-containing ester inter-change products can be used to prepare phosphorus-containing foams having any desired amount of phosphorus. Foams prepared from such mixtures retain the structural features of the phosphorus-free sugar polyols, while fire resistance and flame retardancy are incorporated due to the presence of the phosphorus in the phosphorus-containing ester interchange product.

The methods of preparation of the polyurethane foams remain the same except that two polyols are used and the amount of isocyanate required for their reaction must be determined separately, although the polyisocyanate would be added as usual as a single quantity.

EXAMPLE 1

A. Preparation of Methyl 3-(Dimethylphosphono) propionate

Dimethyl phosphite, 110.1 g (1.0 mole), and methyl acrylate, 86.0 g (1.0 mole) were placed in a 1 liter, 4-necked flask fitted with a stirrer, reflux condenser protected by a calcium chloride guard tube, dropping funnel, and a thermometer. A solution of sodium methoxide was prepared by dissolving metallic sodium in anhydrous methyl alcohol. This was added dropwise to the acrylate-phosphite solution causing an exotherm. Temperature of reaction was held below 40–45 C by use of an ice-water bath. When no exotherm occurred during addition of sodium methoxide solution, the reaction was assumed to be complete. The mixture was distilled under reduced pressure yielding 174.8 g (89.2 percent) of a clear, colorless liquid, boiling point 146–148 C at a pressure of 12 mm Hg. The refractive index corrected to 20 C was 1.4375.

B. Polyoxypropylene sucrose (0.5 mole), hydroxyl number 536.0 (acetic anhydride-pyridene method), viscosity 25,800 cps., Brookfield Viscometer, Model RVF, number 7 spindle at 20 rpm, was placed in a 1 liter, 3-necked flask fitted with a stirrer, takeoff condenser connected to house vacuum, nitrogen inlet, and a thermometer. The polyol was heated to 120 C and 5 ml of tetraisopropyl titanate were added. Methyl 3-(dimethyl-phosphono)propionate (0.5 mole) was added dropwise and the reaction mixture held at 120 C for 24 hours. The final product was a clear brown liquid, hydroxyl number 390, viscosity 13,400 cps., and containing 2.75 percent phosphorus.

EXAMPLE 2

Using the procedure described above, the same polyoxypropylene sucrose (0.5 mole) was transesterified with methyl 3-(dimethylphosphono) propionate (1.0 mole) using 10 ml of tetraisopropyl titanate. The phosphorus-containing polyol was a clear, dark brown fluid liquid, hydroxyl number 284.9, viscosity 7,600 cps., and containing 5.20 percent phosphorus.

EXAMPLE 3

Polyoxyethylene sorbitol (0.1 mole), hydroxyl number 447, viscosity 8,600 cps. was placed in a 500 ml. 3-necked flask fitted with a stirrer, takeoff condenser with a Dean-Starke moisture trap, nitrogen inlet, and a thermometer. The polyol was heated to 105 C and 2 ml of tetrabutyl titanate were added. Methyl 3-(dimethylphosphono) propionate (0.1 mole) was added dropwise. The reaction mixture was held at 120 C overnight. The final product was a light amber liquid, hydroxyl number 315, viscosity 10,400 cps.

EXAMPLE 4

A. Preparation of Butyl 3-(Dibutylphosphono) propionate

Dibutyl phosphite, 776.8 g (4.0 mole), and butyl acrylate, 512.7 g (4.0 mole) were placed in a 3 liter, 4-necked flask with suitable fittings. A solution of sodium butoxide was prepared by dissolving metallic sodium in anhydrous butyl alcohol. The alcohol was warmed to increase the rate of dissolution. This solution was added dropwise to the acrylate-phosphite solution. Temperature of reaction was held at 40–45 C by use of a water bath. When no exotherm occurred during addition of sodium butoxide solution, the reaction was assumed to be complete. The final mixture was allowed to stir overnight. The mixture was distilled under reduced pressure yielding 1142.8 g (88.6 percent) of a clear, colorless liquid, boiling point 190–192 C at a pressure of 1.2 mm Hg. The refractive index corrected to 20 C was 1.4392.

B. Polyoxypropylene sucrose (1.0 mole), hydroxyl number 457, viscosity 292,400 cps., was placed in a 2 liter, 4-necked flask equipped with suitable fittings. Butyl 3-(dibutylphosphono) propionate (1.0 mole) was added and the mixture was heated to 120 C. Two 5 ml portions of tetraisopropyl titanate were added over a period of time. The reaction mixture was held at 120 C for twenty-four hours. The final polyol was a clear brown liquid, hydroxyl number 343, and containing 2.48 percent phosphorus.

EXAMPLE 5

Using the procedure described above, the same polyoxypropylene sucrose (0.5 mole) was transesterified with butyl 3-(dibutylphosphono) propionate (1.0 mole) using 10 ml of tetraisopropyl titanate. The final phosphorus-containing polyol was a clear, dark brown fluid liquid, hydroxyl number 270 and containing 4.12 percent phosphorus.

EXAMPLE 6

Preparation of Methyl 2-(Dimethylphosphono)acetate

Trimethylphosphite 70 g (0.56 mole) was heated to 130 C and methyl chloroacetate 55 g (0.5 mole) was added over 1½ hours with heating continued and gradually increasing the temperature of the reaction mixture to 175 C over a period of an hour. Then the reaction was cooled. Ethyl chloride 24 g was collected in an isopropanol-dry ice trap (theoretical 26 g $C_2H_5Cl$).

Analysis by gas chromatography indicated that the reaction product contained 69.22 percent methyl 2-dimethyl phosphonoacetate, 6 percent trimethyl phosphite, 9 percent methyl chloroacetate, and 11 percent methyl dimethyl phosphonate.

The reaction product, 101.8 g, was fractionally distilled at reduced pressure using an 8 inch Vigreaux column. Yield of methyl 2-(dimethylphosphono)acetate was 69.2 percent.

Esterinterchange of Methyl 2-(Dimethylphosphono)acetate with Polyoxypropylene Sucrose Polyoxypropylene sucrose (465 OH No. = hydroxyl number, MW 981) 185 g, methyl 2-(dimethylphosphono)acetate 253 g (1–7 mole ratio sugar polyol to phosphonate, final mole ratio 1–3) and tetraisopropyl titanate 10.5 g was heated at 130 C under nitrogen with a condenser and Dean-Stark trap to collect ethyl alcohol. After 3½ and 5½ hours at 130°, the reaction mixture contained 18.6 percent and 15.1 percent unreacted phosphonate. Initial concentration of phosphonate was 52.8 percent. Phosphonate was determined by gas chromatography with dimethyl terephthalate as an internal standard. After 6 hours at 130 C when the unreacted phosphonate was 11 percent, 259 g polyoxypropylene sucrose was added and heating continued for a total of 7½ hours at 130 C. The reaction was then cooled. Hydroxyl number of the final product was 211 (calculated for complete esterinterchange 194). Phosphorus content was 6.3 percent (calculated 6.4 percent P).

EXAMPLE 7

Preparation of Ethyl 2-(Diethylphosphono)acetate

Ethyl chloroacetate 615 g (0.50 mole) was heated to 130° in a 2 liter, 3-neck flask and triethyl phosphite 830 g (0.5 mole) was added over 3 hours. At the end of this addition, the temperature was increased to 140 C. Reaction was sampled after 1, 2 and 3¼ hours at 140 C and the samples analyzed by gas chromatography for starting materials and product. The reaction was cooled after 3½ hours heating at 140–144 C and fractionally distilled at reduced pressure. Ethyl chloride 269 g (theo. 325 g $C_2H_5Cl$) was collected during the course of the reaction.

At the end of the 3¼ hour heating period the reaction product contained 3.25 percent triethyl phosphite, 5.32 percent ethyl chloroacetate, and 85.95 percent phosphonate product.

Yield of reaction product was 1074 g. This included 7.0 g pot residue and 23.8 g volatile product collected in the isopropanol-dry ice cooled trap which was mostly unreacted starting material. Fractions 3 and 4 were used for esterinterchange with sucrose polyol. Total yield of phosphonate product in the four fractions was 1010 g (90.0 percent).

Esterinterchange of Ethyl 2-(Diethylphosphono)acetate with Polyoxypropylene Sucrose Polyoxypropylene sucrose 176 g (0.18 mole) ethyl 2-(diethylphosphono)acetate 285 g (1.27 moles) and tetraisopropyl titanate 10.5 g were heated in a 1 liter, 3-neck flask, under nitrogen, with a condenser and Dean-Stark trap at 130 C. After 4½ and 6½ hours at 130 C, 16.1 percent and 12.2 percent phosphonate was unreacted. After 7½ hours at 130 C 236 g sucrose polyol was added and heating was continued at 130 C for an additional hour. The reaction was then cooled. Yield was 629 g (98 percent), hydroxyl number 208, 6.0 percent P (185 hydroxyl number and 6.1% P calculated for complete esterinterchange).

EXAMPLE 8

Stable polyurethane rigid foams were prepared by the following "one-shot" procedure:

Components in parts by weight used to prepare the rigid urethane foams were as follows:

| | Foam A | Foam B | Foam C |
|---|---|---|---|
| Polyoxypropylene Sucrose (OH No. 536) | 200 | — | — |
| Polyoxypropylene Sucrose reacted with 1 mole methyl 3-(dimethylphosphono) propionate (OH No. 390) [Example 1] | — | 200 | — |
| Polyoxypropylene Sucrose reacted with 2 moles methyl 3-(dimethylphosphono) propionate (OH No. 285) [Example 2] | — | — | 200 |
| Polyoxyalkylene polydimethyl siloxane surfacant | 6.3 | 5.9 | 4.9 |
| Triethylene diamine | 6.3 | 6.0 | 7.3 |
| Polymethylene polyphenyl isocyanate | 284.8 | 190.3 | 191.4 |
| Trichlorofluoro methane (Freon R-11B) | 70.0 | 70.0 | 60.0 |

The polyol, surfactant, catalyst, and Freon were hand-mixed to a uniform fluid paste. The polymeric isocyanate was added and the mixture stirred for 25 seconds. The mix was then poured into a mold and allowed to rise free. The foam was aged one day, then removed from the mold. Foam A (zero phosphorus) had a burn rate of 8.50"/min. and was classified as "burns" (ASTM 1692-59T). Foam B (1.54 percent phosphorus) was classified as "self-extinguishing", and Foam C (2.65 percent phosphorus) was classified as "nonburning."

EXAMPLE 9

Useable rigid polyurethane foams were prepared using the procedure described in Example 8.

Components in parts by weight used to prepare the urethane foams were as follows:

| | Foam D | Foam E |
|---|---|---|
| Polyoxypropylene Sucrose reacted with 1 mole butyl 3-(dibutylphosphono) propionate (OH No. 343) [Example 4] | 200.0 | — |
| Polyoxypropylene Sucrose reacted with 1 mole butyl 3-(dibutylphosphono) propionate (OH No. 348) | — | 200.0 |
| Silicone surfactant | 6.5 | 6.4 |
| Amine catalyst | 5.5 | 5.0 |
| Polymeric isocyanate | 166.7 | 169.3 |
| Trichlorofluoro methane | 70.0 | 65.0 |
| Mix time, seconds | 20 | 15 |

Foam D (1.33 percent phosphorus) and Foam E (1.50 percent phosphorus) are both "self-extinguishing."

EXAMPLE 10

Stable, flame-retardant rigid polyurethane foams were prepared using the phosphonate polyols prepared in Examples 6 and 7.

Components in parts by weight used to prepare these foams were as follows:

| | W | X |
|---|---|---|
| Polyol Example 6 | 104.0 | — |
| Polyol Example 7 | — | 112.0 |
| Polyoxypropylene sucrose (OH No. 457) | 133.6 | 130.5 |
| Silicone surfactant | 6.6 | 6.5 |
| Amine catalyst | 7.0 | 5.7 |
| Trichlorofluoromethane | 80 | 80 |
| Polymeric isocyanate | 200.0 | 200.0 |

The urethane foams thus prepared contained 1.5 percent phosphorus. Both foams were rated as nonburning according to ASTM-1692-59T.

We claim:

1. A polyurethane foam made by reacting a polyisocyanate in the presence of a blowing agent with the ester interchange reaction product obtained by heating 1 mole of an oxyalkylated sugar and 1–6 moles of a phosphonate ester of the formula:
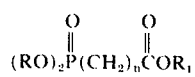
wherein R and $R_1$ are alkyl groups having 1–4 carbon atoms, and n is 1–2.
* * * * *